ated Patent [19]

United States Patent [19]
Cvitas et al.

[11] Patent Number: 4,734,193
[45] Date of Patent: Mar. 29, 1988

[54] APPARATUS FOR CONTINUOUSLY SEPARATING LIQUID PHASES OF DIFFERENT DENSITY

[75] Inventors: Vilim Cvitas, Leonding; Karl Faltejsek, Linz; Reinhart Hanke; Gottfried Klinar, both of Leoben, all of Austria

[73] Assignee: Voest-Alpine Aktiengesellschaft, Linz, Austria

[21] Appl. No.: 907,380

[22] Filed: Sep. 15, 1986

[30] Foreign Application Priority Data

Sep. 25, 1985 [AT] Austria .................................. 2798/85

[51] Int. Cl.⁴ .......................................... B01D 17/032
[52] U.S. Cl. ................................ 210/242.3; 210/776; 210/527; 210/923
[58] Field of Search ............... 210/243, 708, 776, 923, 210/527, 799, 242.3, 241, DIG. 5

[56] References Cited

U.S. PATENT DOCUMENTS

| 2,034,285 | 3/1936 | Eddy | 210/799 |
| 3,255,571 | 6/1966 | Walker et al. | 210/243 |
| 4,392,957 | 7/1983 | Webb | 210/923 |
| 4,430,222 | 2/1984 | Walker | 210/DIG. 5 |

FOREIGN PATENT DOCUMENTS 2535824 3/1976 Fed. Rep. of Germany .
2905017 10/1979 Fed. Rep. of Germany .
743692 6/1980 U.S.S.R. ............................... 210/243

Primary Examiner—Richard V. Fisher
Assistant Examiner—Richard D. Jordan
Attorney, Agent, or Firm—Cushman, Darby & Cushman

[57] ABSTRACT

The apparatus for continuously separating liquid phases of different density consists of a separating basin (1) within which are arranged partition walls (5) for being lifted and lowered and for being moved one in direction to the other or for being swivelled. Swivelling of the partition walls (5) is effected about an eccentrically arranged axis (7) such that during the swivelling movement the partition walls (5) are simultaneously lifted or lowered. The partition walls (5) can be driven by push rods (8) and thus be swivelled in the contrary sense. When swivelling the partition walls (5) in one direction, the liquid level is lifted in the chamber defined between the partition walls and is lowered in the adjacent chamber, noting that the portion having the lower specific gravity flows over the upper edge, assuming a lower level, of the one partition wall in one direction (11) and that the proportion having the higher specific gravity flows in direction of the arrow (12), i.e. in the opposite direction, below the bottom edge of the outer partition wall (5). The separated phases are collected at the front sides of the separating basin (1). Supply is effected by a supply means (10) approximately centrally of the separating basin (1).

7 Claims, 2 Drawing Figures

U.S. Patent  Mar. 29, 1988  4,734,193
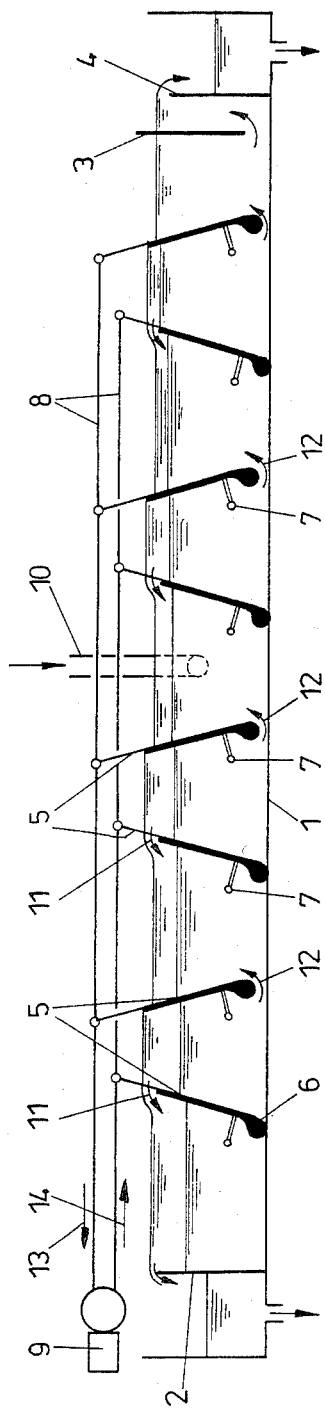
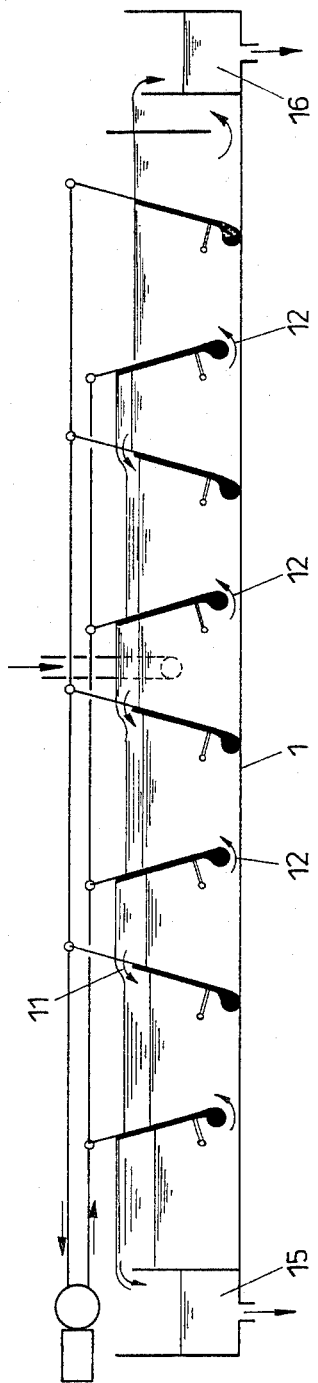

APPARATUS FOR CONTINUOUSLY SEPARATING LIQUID PHASES OF DIFFERENT DENSITY

BACKGROUND OF THE INVENTION

1. Field of the Invention

The invention refers to an apparatus for continuously separating liquid phases of different density.

2. Description of the Prior Art

There are known several continuous and discontinuous decanting apparatuses from which the floating phase can be discharged separately from the heavier phase located therebeneath. Discontinuously operated apparatuses are relatively simple because it is sufficient to extract the lower phase until only the upper or floating phase remains. The floating phase can then be extracted via the same outlet. When using overflow weirs for extracting the floating phases, phase separation is, with continuous supply, only reliably feasible in very large apparatuses, and a number of expensive devices are required for controlling the exact position of the phase limit. As a rule, an exact phase separation is in these apparatuses only possible if turbidity sensors are arranged within the interior of a basin to be in a position to determine the exact position of the phase limiting surface.

SUMMARY OF THE INVENTION

The invention now aims at providing a simple and compact apparatus of the initially mentioned type which makes possible a relatively exact phase separation without additional auxiliary equipment. The apparatus according to the invention shall in particular be suitable for separating oil phases from aqueous solutions. For solving this task, the invention provides partition walls within a basin in transverse orientation relative to the flow direction, the partition walls being located adjacent one another, as seen in flow direction. The partition wall can be lifted and lowered in an opposite contrary sense and be alternately moved one in direction and then the other and one away from the other or being swivelled in the opposite sense. The lifting drive or the swivel axes of the partition walls are arranged such that in one end position of the swivel area or of the stroke of the partition walls the lower edges of the partition walls tightly engage the bottom of the basin and in other swivelled positions or lifted positions the partition walls give a free flow cross section. At both front sides of the basin there are provided drain passages for the separated phases. On account of arranging a plurality of partition walls within a basin, there are formed individual chambers, in each of which can take place a phase separation. On account of the partition walls being arranged for being alternately moved in direction one to the other and away from one another or, respectively, for being swivelled in the opposite sense, the liquid level within adjacent chambers is alternately lifted and lowered. If now one partition wall is lowered and the other partition wall is simultaneously lifted, there results between adjacent chambers a gradient of hydrostatic pressure providing the possibility to transport both phases in opposite directions. By lifting one partition wall and, respectively, by swivelling one partition wall around a swivelling axis for clearing a flow passage at the bottom edge of the partition wall, there results the effect that the phase of greater specific gravity flows out of the chamber showing the higher liquid level at the area located adjacent the bottom, whereas the phase of lower specific gravity flows over the adjacent partition wall, which is the lowered partition wall under the described condition, into the adjacent chamber. This adjacent partition wall sealingly engages the bottom of the basin in the lowered lifting position or, respectively, the swivelled position, so that the phase having the lower specific gravity flows in opposite direction to the phase having the higher specific gravity. With such an apparatus there can be obtained a high degree of separation of the phase even in case of relatively small sized constructions, and such an apparatus may without difficulties be continuously charged. In a preferred manner, the supply means for the phases to be separated is, in this case, arranged centrally between the outlets, arranged on both front sides of the basin, for the phase of higher specific gravity and the phase of lower specific gravity, respectively.

The preferred embodiment of the apparatus according to the invention, which may do with a comparatively simple drive means, is designed such that the partition walls are plane walls and that the swivel axes are arranged in parallel relation to the plane of the partition walls and in transverse direction relative to the flow direction. In such an embodiment, adjacent partition walls can be swivelled in mutually opposite sense, so that there results cycling lifting and lowering of the liquid level within adjacent chambers separated one from the other by partition walls. Simultaneously with such swivelling movement, there is alternatively obtained an overflow or an underflow so that there results a directional transport of both phases in opposite direction and a separation of relatively pure phases.

In a simple manner, the partition walls can be kinked or bent. In all these cases, one can do with a push rod drive, noting that two push rods can be driven, for example by one and the same drive motor, via a crank drive for effecting movements of mutually opposite sense. In this case, the arrangement is advantageously selected such that there are provided two push rods, that each second partition wall, as seen in flow direction, is connected with a common push rod and that each push rod is adapted for being driven in contrary sense to the other push rod.

For the purpose of avoiding any undesired overflow within the area of the phase limiting surfaces and for reliably establishing differing liquid levels within adjacent chambers, the partition walls, according to an advantageous embodiment, carry sealing elements at their lateral edges and at the bottom edge, in particular wiper-like sealing elements at the lateral edges and toroidal sealing elements at the bottom edge.

At both front sides of the apparatus according to the invention there can be extracted relatively pure phases, for which purpose there is advantageously arranged at one front side of the basin a combination of an underflow weir and an overflow weir and at the opposite front side an overflow weir.

In a particular advantageous manner, the arrangement can be further developed such, that for the purpose of enhancing the coalescence, there are arranged between the movable partition walls wire mesh parcels, noting that the alternating upward movement and downward movement of the liquids promotes coalescence. For the purpose of splitting off the emulsified portion of the phases, electrode parcels are arranged between the movable partition walls and, in the supply means leading to the first chamber located between movable partition walls, the alternating upward movement and downward movement of the liquids resulting in a cleaning effect on these electrodes.

BRIEF DESCRIPTION OF THE DRAWING

In the following, the invention is further explained with reference to an embodiment shown in the drawing. In the drawing FIG. 1 shows a longitudinal section through an inventive apparatus comprising swivellable partition walls being shown in one end position of their swivelling movement and FIG. 2 shows a view analogous to that of FIG. 1 with the partition walls being swivelled into their other end position of swivelling movement.

DETAILED DESCRIPTION OF THE PREFERRED EMBODIMENT

In FIGS. 1 and 2, reference numeral 1 indicates a separating basin. Such a separating basin can be designed as an elongated prismatic basin. At one front side of this basin there is arranged an overflow weir 2 and an underflow weir 3 is arranged at the opposite front side of the basin. The underflow weir 3 is followed by an overflow weir 4 for continuously discharging the liquid of greater specific gravity.

Within the interior of the basin, there are arranged swivellable partition walls 5 carrying at their bottom edge an elastic sealing bulge 6. The partition walls 5 are supported for being swivelled around axes 7 extending in parallel relation to the plane of the swivellable partition walls and being arranged outside of the plane of said walls. By such an eccentric arrangement of the swivel axes 7 there results, as can be seen when comparing FIG. 1 with FIG. 2, the effect that, in one swivelled position, adjacent partition walls alternately contact with their elastic sealing bulge provided on the bottom edge the basin and are lifted off the bottom of the basin. The swivellable partition walls 5 are driven by push rods 8 which are driven by a motor 9 to effect movements in mutually opposite sense. Supply of the phases to be separated is effected by a supply means 10 approximately in the central area of the separating basing 1.

In FIG. 1, each second partition wall 5 is swivelled such that it contacts with its elastic bulge the bottom of the separating basin, noting that simultaneously the upper edge of the same partition wall is lowered relative to its opposite swivelled position. On account of the relative movement of adjacent partition walls, there results a fluctuation of the liquid level and the phase of lower specific gravity can flow off in direction of the arrows 11. Simultaneously, a flow passage for transporting away the phase of higher specific gravity in direction of the arrow 12 is given free between the adjacent partition wall 5 and the bottom of the separating basin.

As results from FIG. 2, the transport direction 11 for the phase of lower specific gravity and also the transport direction 12 for the phase of higher specific gravity is the same when shifting the push rods in the opposite sense into the other end position. By shifting the push rods in opposite sense and in direction of the arrows 13 and 14, there are alternately provided chambers of differing liquid level, noting that on account of the permanent flow direction 11 in direction to the discharge means 15 for the phase of lower specific gravity and the flow direction 12 in direction to the discharge means 16 for the phase of higher specific gravity, there results an excellent separation effect with only short constructional length. The continuous operation can be maintained without adjusting the overflow weir and the underflow weir, respectively, at the front sides of the basin, and no expensive control means are required for operating the apparatus.

For improving the phase separating effect knitting parcels, such as for example wire mesh parcels, can be arranged within the individual chambers between the movable plates for the purpose of enhancing coalescence and, respectively, the growth of droplets. For the purpose of splitting emulsions, there can be arranged between adjacent swivellable partition walls also electrode parcels, noting that the partition walls themselves may, in a particularly simple manner, be made of conductive material and be directly used as electrode. In these cases, a consumable electrode may be fixed on the bottom of the basin.

What is claimed is:

1. Apparatus for continuously separating liquid phases comprising: a basin for receiving mixed phase liquids and in which the phases separate to upper and lower layers, said basin having an imperforate bottom and sides and further having first and second outlets in opposite sides thereof for the upper and lower layers, respectively, said outlets determining opposite, horizontal, parallel flow directions for the upper and lower layers; a plurality of partition walls within the basin, said partition walls being transverse to the flow direction and spaced apart in the flow direction, said partition walls having opposite end edges in sealing contact with respective sides of the basin, and drive means for moving the partition walls relative to the basin such that adjacent partition walls can be lifted and lowered in an opposite sense and such that adjacent partition walls can be moved toward and away from each other, said partition walls having lower edges which, in the lowered position of the respective partition wall, sealingly engage the bottom of the basin and which, in the raised position of the respective partition wall, are spaced from the bottom of the basin to provide a free flow cross-section for the lower layer.

2. Apparatus as in claim 1 wherein said means for moving the partition walls includes means mounting each partition wall for pivotal movement about a horizontal axis which is transverse to said flow direction and further includes means for swinging the partition walls about said axes.

3. Apparatus as in claim 2 wherein the partition walls are planar.

4. Apparatus as in claim 2 wherein said means for swinging the partition walls includes two push rods and means for driving the push rods in opposite directions, every other partition wall being connected to a common push rod.

5. Apparatus as in claim 1 wherein the end edges and bottom edges of the partition walls carry sealing elements.

6. Apparatus as in claim 1 including supply means for supplying mixed phase liquid to the basin at a location centrally between said outlets.

7. Apparatus as in claim 1 wherein one of said outlets includes an underflow weir and an overflow weir for discharging the lower phase and wherein the other outlet includes an overflow weir for discharging the upper phase.

* * * * *